United States Patent [19]

Doty et al.

[11] Patent Number: 4,976,474
[45] Date of Patent: Dec. 11, 1990

[54] SELECTIVE ACTIVE OVERT COMFORT SYSTEM

[75] Inventors: Gerald A. Doty, Crown Point, Ind.; Eric T. Johnson, Momence, Ill.

[73] Assignee: Occupany Safety Systems, Inc., Olympia Fields, Ill.

[21] Appl. No.: 336,100

[22] Filed: Apr. 11, 1989

Related U.S. Application Data

[63] Continuation-in-part of Ser. No. 176,304, Mar. 31, 1988.

[51] Int. Cl.⁵ .............................................. B60R 22/34
[52] U.S. Cl. ............................. 242/107.7; 242/107.6; 280/807
[58] Field of Search .................... 242/107.6, 107.7; 280/807, 808, 806; 297/475

[56] References Cited

U.S. PATENT DOCUMENTS

| 3,682,412 | 8/1972 | Kuszynski | 242/107.4 |
| 3,700,184 | 10/1972 | Francis | 242/107.4 |
| 3,834,646 | 9/1974 | Heath | 242/107.7 |
| 3,851,836 | 12/1974 | Sprecher | 242/107.7 |
| 3,869,098 | 3/1975 | Sprecher | 242/107.4 |
| 4,023,746 | 5/1977 | Magyar | 242/107.4 R |
| 4,053,116 | 10/1977 | Takada | 242/107.4 R |
| 4,065,072 | 12/1977 | Magyar | 242/107.7 |
| 4,106,722 | 8/1978 | Inukai et al. | 242/107.7 |
| 4,293,107 | 10/1981 | Ziv | 242/107.7 |
| 4,386,745 | 6/1983 | Patel et al. | 242/107.4 |
| 4,458,920 | 7/1984 | Ozaki | 280/801 |
| 4,506,845 | 3/1985 | Tsukamoto | 242/107.7 |
| 4,509,708 | 4/1985 | Fohl | 242/107.7 |
| 4,553,716 | 11/1985 | Honl | 242/107.7 |
| 4,585,185 | 4/1986 | Ueda | 242/107 |
| 4,603,877 | 8/1986 | Espinoza et al. | 280/807 |
| 4,669,751 | 6/1987 | Unger | 280/807 |
| 4,854,522 | 8/1989 | Brown et al. | 242/107.6 X |

Primary Examiner—John M. Jillions
Attorney, Agent, or Firm—Fitch, Even, Tabin & Flannery

[57] ABSTRACT

A tensionless apparatus for a seat belt and/or shoulder harness retractor assembly is provided, which requires activation of a manual overt actuator and subsequent manual belt protraction to engage the tensionless mode from a release state. The tensionless device has a comfort or "memory" function allowing a limited motion of the user below a predetermined distance and subsequent return to the tensionless position. But belt protraction beyond the predetermined distance again shifts the tension device into the release state with the belt being biased by the retractor rewinding means.

10 Claims, 5 Drawing Sheets

SELECTIVE ACTIVE OVERT COMFORT SYSTEM

This is a continuation-in-part application of copending application S.N. 176,304, filed Mar. 31, 1988.

The invention relates to a safety belt system having a tension-relieving mechanism and more specifically to such a system in which the tension is relieved by a deliberate manual actuation of a control switch, lever or other actuator.

The usual tension-relieving mechanism is placed into the tensionless or comfort mode by the wearer having extended the seat belt about his torso and shoulder and then pulling the seat belt to further protract the belt, followed by a release of the belt for a slight belt rewind movement. This sequence causes an internal locking pawl to engage a ratchet wheel fixed to the reel shaft to prevent continued rewinding of the belt onto the reel under the force of the reel rewinding biasing means. Thus, a vehicle occupant's shoulder is relieved of the force of the rewind spring acting to rewind the shoulder belt. Such devices are shown in U.S. Pat. Nos. 3,851,836; 3,869,098 and 3,834,646. Conventional tensionless mechanisms generally have a memory system, which allows the occupant to move slightly forward to extract one or two inches of seat belt from the retractor without cancelling the tensionless mode. Thus, if the occupant moves rearward in his seat to the original tensionless position, the tension-relieving pawl again becomes engaged with the ratchet wheel to relieve the tension. Should the occupant extract more seat belt than the memory distance, the tension-relieving mechanism is automatically shifted to its ineffective or release position, causing the seat belt to tightly rewind against the occupant; or if the occupant opens the vehicle door, the seat belt rewinds to its fully wound position on the seat belt reel. That is, to assume that seat belts are fully wound upon an occupant's leaving the vehicle, a door-operated release means senses the opening of the door and shifts the tension-relieving mechanism to its release state, if it is already not there, thereby causing a rewind of the belt to its fully wound position on a reel.

In other overt or manual actuator systems for tension relieving, the system is set into its tensionless state by the occupant actuating a means such as a switch, which closes a circuit to operate a solenoid to shift the locking pawl into locking engagement with the ratchet wheel to immediately place the tensionless system into its tension-relieving state irrespective of occupant location. This is in contrast to usual non-electrical tensionless systems, in which a belt protraction is required to set the tensionless device into a tensionless mode. Typically, an electrically operated-tensionless system, such as disclosed in U.S. Pat. No. 4,585,185, can only be released by a subsequent electrical operation of a switch means. Manipulation of the belt beyond a memory distance will not cause an automatic rewind of the belt, as the solenoid has shifted the tension-relieving pawl into position and an electrical switch operation is required to shift the solenoid to another state, which shifts the pawl to its release position.

The present invention is directed to providing a manual overt actuator tensionless system requiring the operator to make a conscious decision to operate the actuator, which is usually in the form of a switch or lever, to set the tensionless device in an activated state and to also make a slight protraction of the belt that places the device into a tensionless state to relieve the belt tension on the occupant's shoulder. Thus, in order to shift from this activated position to the tensionless state, the occupant must do two things, move the manual overt actuator and thereafter protract additional belt, which is usually accomplished by grasping and slightly pulling the belt or by shifting one's shoulders forward. Unlike the above-described conventional systems, these belt manipulation steps will not initiate belt-tension relief without performing the first deliberate overt act of operating the manual actuator to set the system in its activated state. As will be described herein, the present invention also provides a memory to return to the tensionless state if the belt is only protracted a short distance and then released. If the belt is protracted beyond the memory distance, the tensionless mechanism automatically is shifted into its release state allowing belt retraction. In addition, the tensionless mechanism may be released by another disengaging or operating means connected to a vehicle door, which means actuates rewinding of the seat belt automatically to its fully wound state upon opening the associated vehicle door.

Thus, the present invention provides a tensionless system that requires an overt actuation by the seat occupant of an actuator, followed by the usual belt manipulations to shift the tensionless mechanism to its tension-relieving state. The present invention also provides for a memory system which allows belt protraction of less than a predetermined length with a return to the tensionless position so long as the predetermined memory length is not withdrawn. In the tension-relieving position, a belt protraction beyond the short, predetermined memory distance results in disengagement of the tensionless device.

Because of the high volume of vehicle production and the multiple safety belt systems, a low cost and simple system is more desirable than a complex and expensive system. The present invention not only provides new and improved functions, but is also inexpensive to manufacture and small in size, which avoids interference with existing seat belt retractor placements.

SUMMARY OF THE INVENTION

The present invention provides a manually-operated, overt actuator tensionless system which requires a slight belt protraction to set the system in its tensionless state. That is, the system requires an overt, generally manual, activation of an actuator by a seat occupant, followed by belt manipulations to engage the tensionless or belt-tension relieving mechanism to the tensionless state or position. The mechanism, in the preferred embodiment, is initially slightly displaced to an activated state or position and subsequent protraction of the belt transfers the belt to the tensionless state, which has a "memory", that is, protraction of the belt beyond the tensionless mode a short distance but less than a predetermined distance will allow the belt to return to the tensionless state. However, belt protraction beyond the predetermined distance will result in disengagement of the belt from the tensionless mode and reversion to the reference, that is belt-tensioned, mode.

The mechanism for the tensionless system is relatively compact and incorporates components which are easily manufactured and not subject to excessive wear. In addition, the assembly lends itself to adoption to a retractor assembly and has an easily operated overt manual actuator, as well as an automatic (door) operator. All of the above assets and attributes of the mechanism are in addition to the primary goal of providing a vehicle occupant with a safe seat belt retractor requiring a conscious act with a manual actuator and belt manipulation to engage the tensionless state, but limits the tensionless state to an acceptable range before an automatic return to the tensioned belt mode.

BRIEF DESCRIPTION OF THE DRAWINGS

In the Figures of the drawings, like reference numerals identify like components and in the drawings.

DETAILED DESCRIPTION OF THE PREFERRED EMBODIMENT

Figure 12:
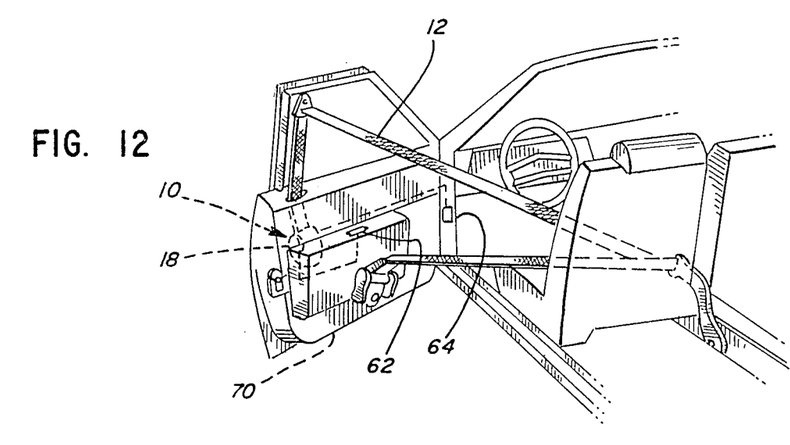
FIG. 12 is a diagrammatic illustration of a potential position of the remote automatic actuator of the present invention.

The present invention broadly relates to a seat belt retractor system generally utilized in automobile safety systems. More particularly, the invention provides a retractor having a manually-engageable tensionless or tension-relieving mode in the retractor system. In FIG. 12, there is illustrated a typical seat system which is an automatic system for applying a lap belt and a shoulder belt to the occupant upon a closing of the door.

Figure 1:
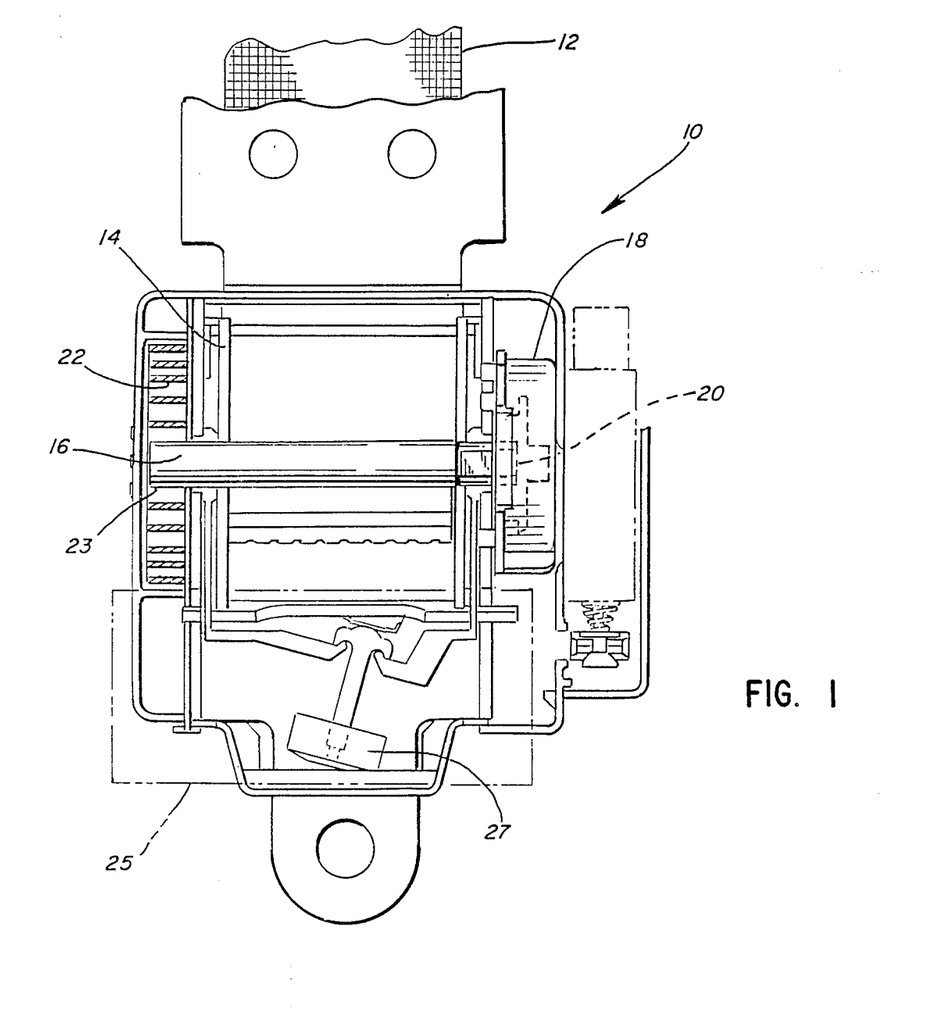
FIG. 1 is a plan view of a safety belt and belt retractor assembly.

As noted above, the present invention is directed to a seat belt retractor 10, as shown in FIG. 1. Retractor 10 includes a belt 12 wound on a webbing reel 14 mounted on shaft 16, and a tensionless or tension-relieving means 18 mounted at one end 20 of shaft 16 for operation with reel 14. A rewind or biasing means or spring 22 is illustrated at the second or other end 23 of shaft 16, which spring 22 biases the reel 14 and belt 12 to the rewound position. Retractor assemblies for rewinding safety belts generally include an emergency locking mechanism 25, broadly shown in dashed outline, which may be of the inertia type operable by a pendulum weight 27 mounted on a support bar to actuate and lock the retractor mechanism against belt protraction during a vehicle accident or other sudden deceleration. A locking mechanism is illustrated and discussed in U.S. Pat. No. 4,361,294 at FIG. 1.

The tension-relieving means 18 is manually operated into the tension-relieving state or mode by operation of an overt manual actuator 62 which may be in the form of a button or lever positioned near the occupant to move a control cable 70 (FIGS. 2 and 7) or it may be in the form of a manually operated, electrical switch (not shown) to activate a solenoid plunger to move an actuator or to shift the tension-relieving means 18 from its non-activated state.

Figure 2:
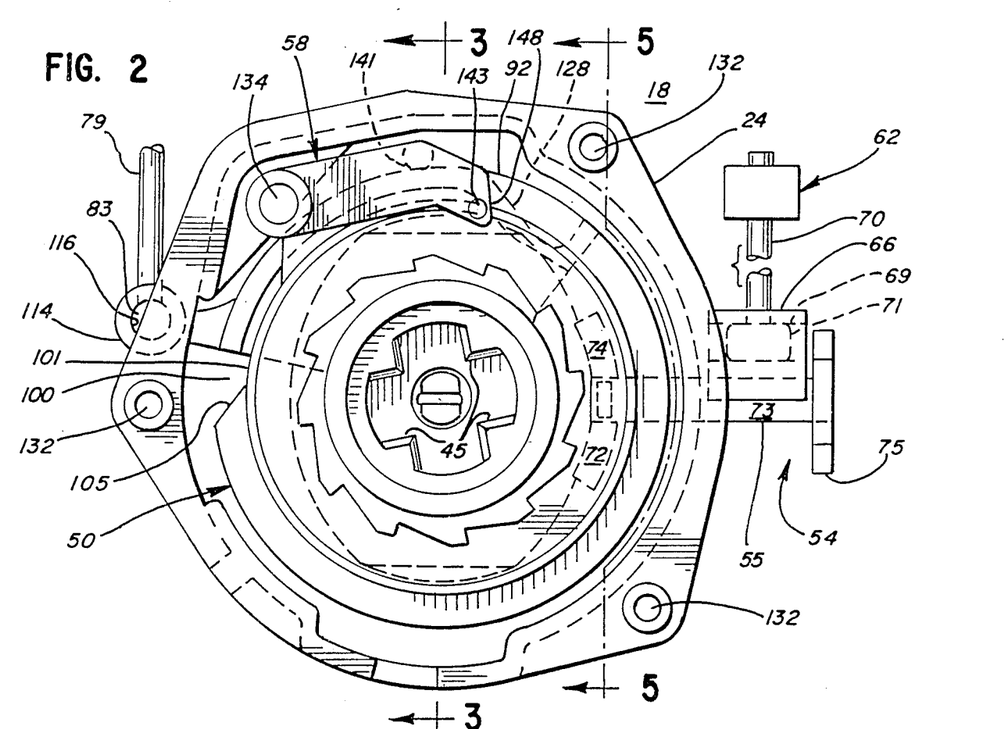
FIG. 2 is a plan view of the preferred embodiment of the tension-relieving apparatus for the retractor assembly in the reference position.
Figures 2A, 10, 11:
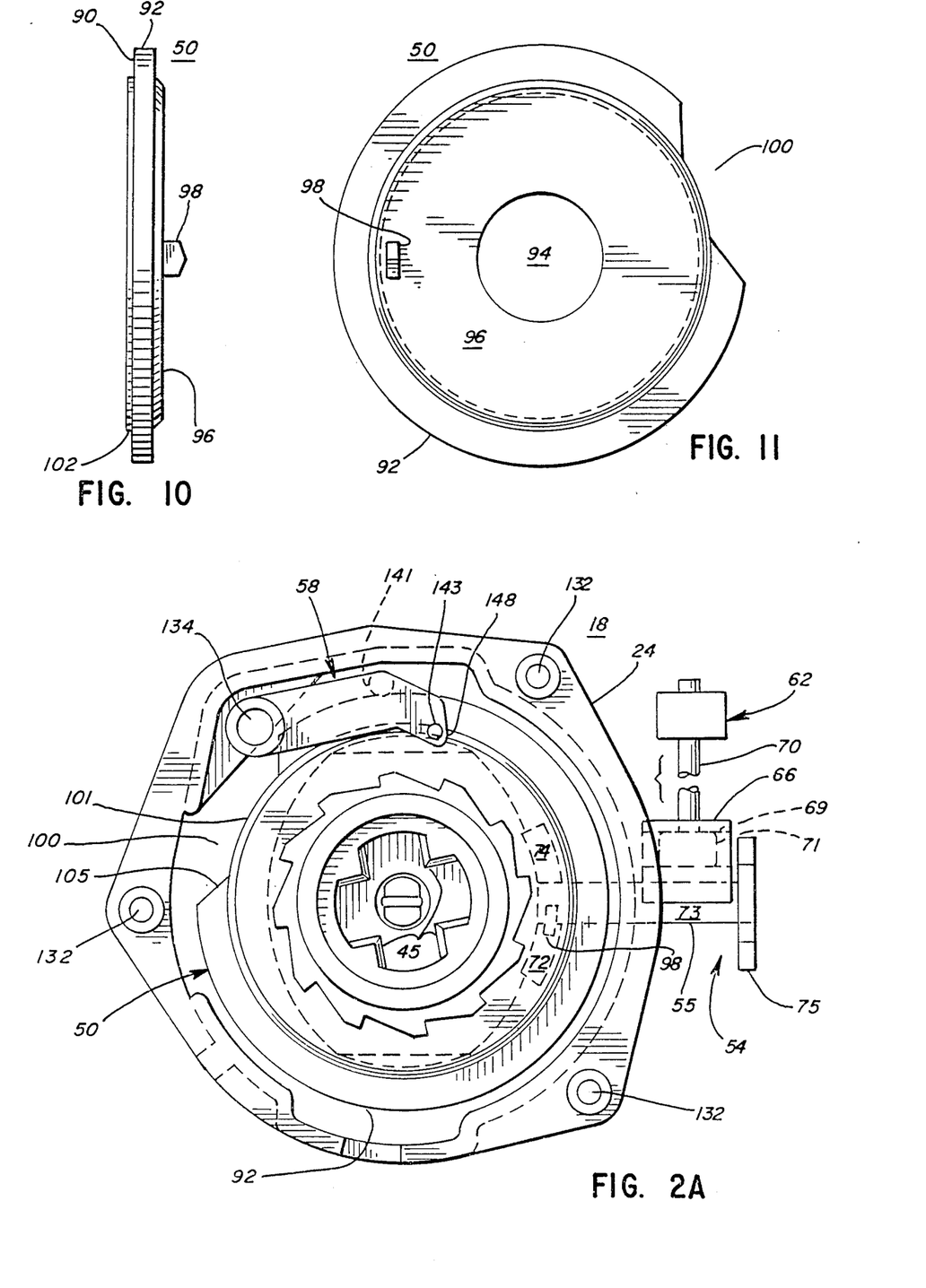
FIG. 2A is a plan view of the preferred embodiment of the tension-relieving apparatus for the retractor assembly in the activated position.
FIG. 10 is a plan view of the lock control disc of the tension-relieving apparatus.
FIG. 11 is a side view of the lock control disc of FIG. 10.
Figures 3, 4, 8, 9:
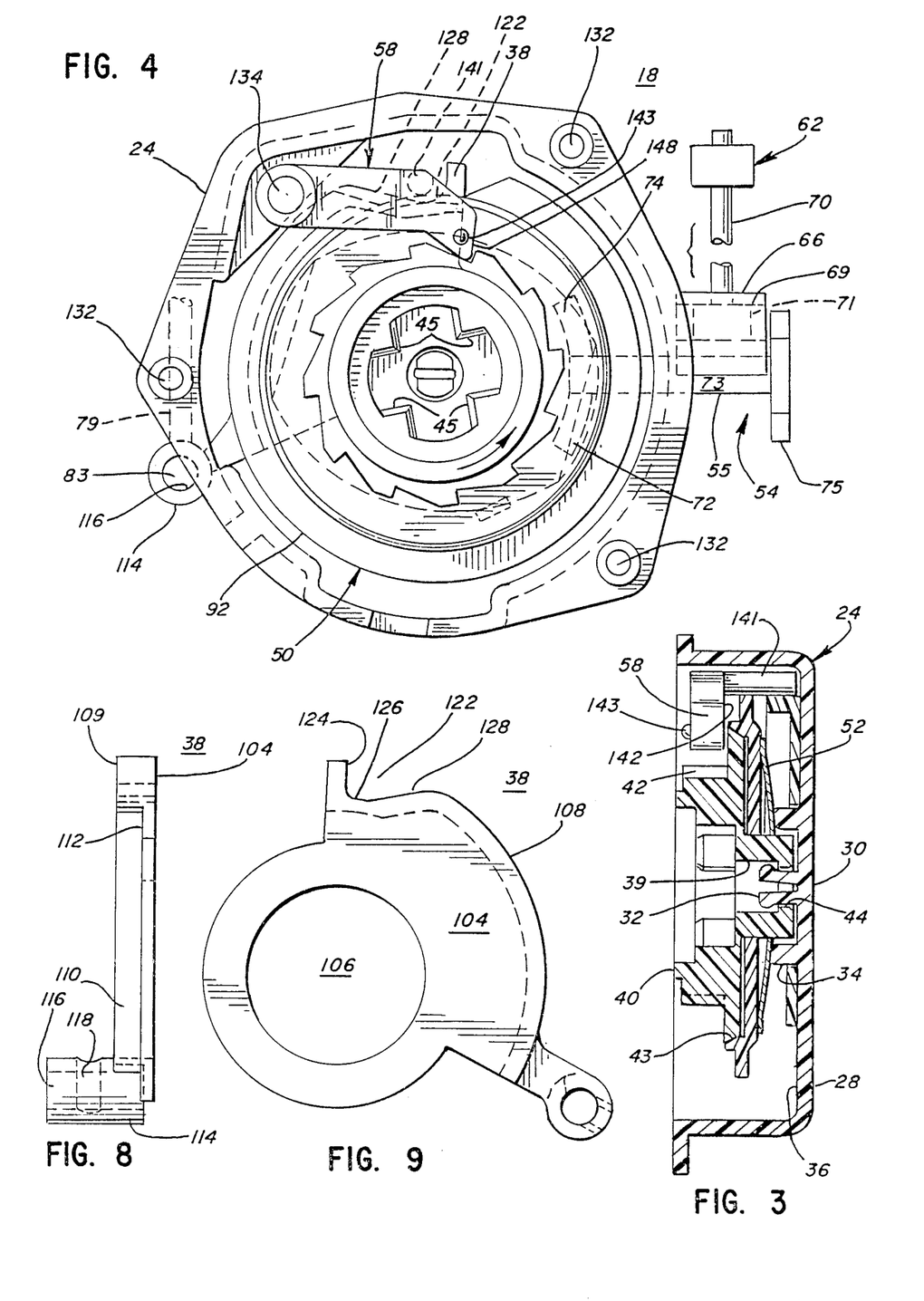
FIG. 3 is a cross-sectional view of FIG. 2 along the line 3—3.
FIG. 4 is a plan view of the tension-relieving apparatus of FIG. 2 in the tensionless mode.
FIG. 8 is a plan view of the unlocking disc of the tension-relieving apparatus.
FIG. 9 is a side view of the unlocking disc in FIG. 8.

In accordance with the present invention, the tension-relieving means 18 may be actuated by operation of the overt manual actuator 62, which shifts the tension-relieving means 18 to an activated or primed state (cf. FIG. 2A); and thereafter a slight belt protraction, automatically shifts the tension-relieving means 18 into the tension-relieving position, as shown in FIG. 4, in which nose 148 of tension-relieving pawl 58 engages teeth 42 on ratchet wheel 40, which is fixed by fingers 45 to reel shaft 16, to hold it against turning in the rewind direction (cf. arrow in FIG. 4) as urged by the reel spring 22. The tensionless means 18 has a memory position or state with pawl 58 held above the teeth 42 by a cam surface 92 on first rotatable member or lock control disc 50. So long as belt 12 is not protracted beyond the memory distance, pawl 58 will be returned into engagement with ratchet teeth 42 to reestablish the tension-relieving state. However, belt protraction beyond the memory distance causes tab means 98 to move into its detented or reference position (FIG. 5) to hold the lock control disc 50 with its cam surface 92 holding pawl 58 from engaging ratchet wheel 40, thus allowing belt 12 to rewind on reel 14. If the occupant opens the vehicle door while the tension-relieving means 18 is in the tensionless state, the remote door actuator 64, usually a plunger or a switch in the doorway, shifts an actuator cable or plunger 79 to shift unlocking member 38 to cam pawl 58 from engagement with teeth 42 on ratchet wheel 40 (cf. FIG. 2), which allows belt 12 to fully rewind when the occupant leaves the vehicle.

Figure 7:
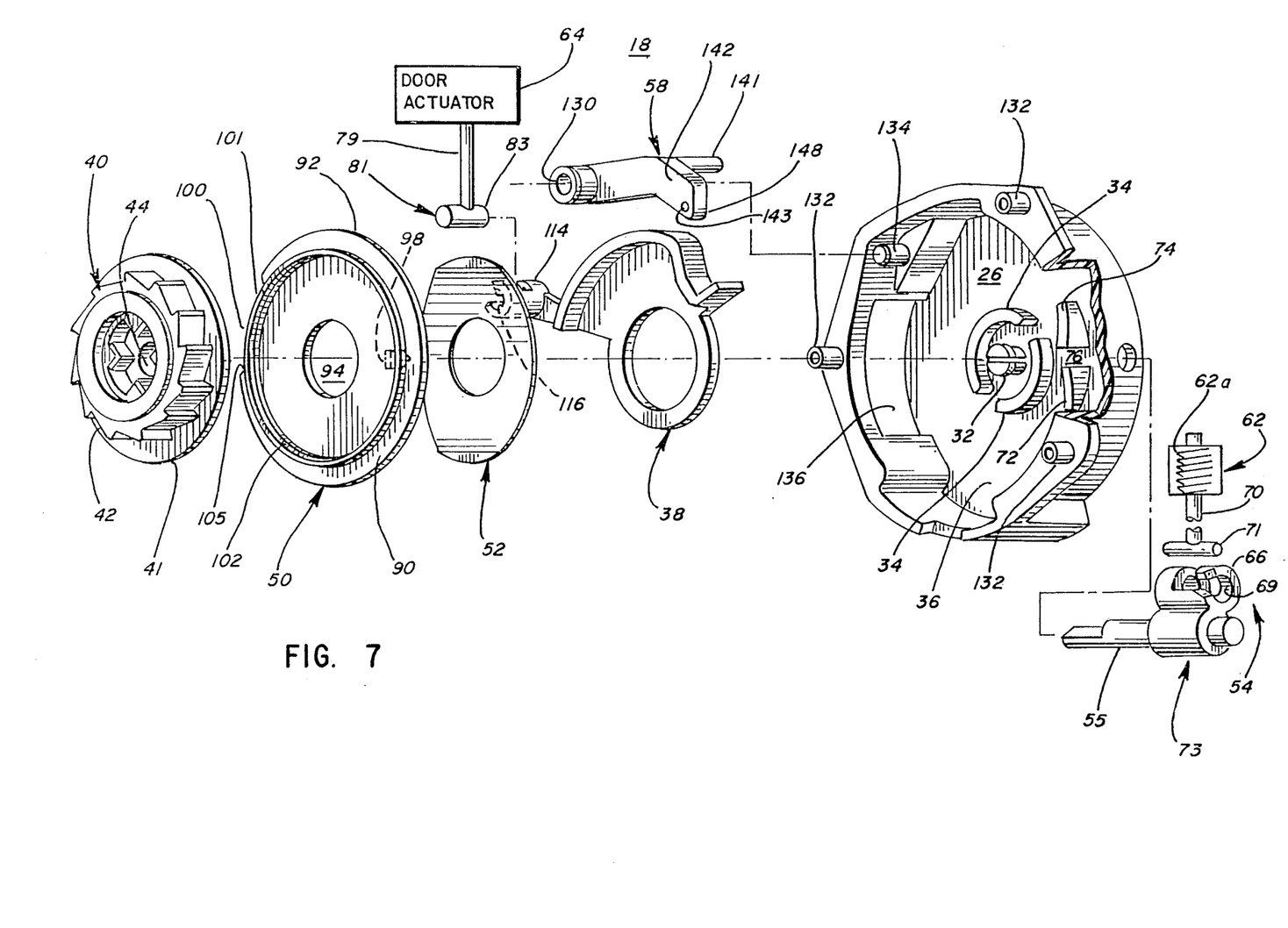
FIG. 7 is an exploded view of the assembly of FIG. 2.

The preferred embodiment of the present invention is illustrated in cross-section in FIG. 3 and in FIG. 7 in an exploded view. As seen in these Figures, the tension-relieving means 18 has a housing or cover 24, which housing or cover is generally cup-shaped with a cavity 26 to receive the pawl and ratchet mechanism as well as the control discs. Housing 24 is illustrated as circular-shaped, as an example and not a limitation, with cover face 28 having a center location 30 (FIG. 4) and a central post 32 extending from inner surface 36 of cover 24 in cavity 26. Post 32 is concentric with a surrounding annulus 34, which also extends from inner surface 36 of cover 24 into cavity 26. Tensionless means 18 includes unlocking disc 38, which is mounted and operable on annulus 34. A ratchet wheel 40, with a plurality of ratchet teeth 42 and indentations, has a bore 44 to receive post 32 for rotatable mounting thereon. When pawl 58 is engaged with ratchet wheel 40, the ratchet wheel holds reel shaft 16 to secure the belt in the tensionless mode against the rewinding bias force of biasing means 22.

A lock control disc or first rotatable member 50 is mounted concentrically with ratchet 40 and is biased for frictional engagement with a flange 41 of ratchet 40 by a disc spring or washer 52 to maintain contact with the frictional surface of ratchet 40. An actuator means 54, to shift the lock control disc with operation of the manual overt actuator, includes an extending arm 55, which is operable to engage or initiate the tensionless means 18 into the tensionless mode. The assembly 18 is shifted into the tensionless mode by actuating the first external or overt manual actuator 62 and is returned to its original release or detented position by a protraction of belt 12 beyond a predetermined distance. Manual overt actuator 62 has a bias means 62a, such as a spring, operable to return actuator 62 and arm 55 to the reference position. A second remote or disengaging apparatus 64 is also operable to disengage the retractor assembly from the tension mode, which remote disengaging apparatus 64 is generally operable by a vehicle door. That is, at door opening the door actuator or disengagement apparatus 64 actuates an unlocking disc 38 to disengage the pawl 58 from the ratchet wheel 40 to establish the tensionless mode of FIG. 2, thereby allowing retractor assembly 10 to rewind belt 12 at belt disengagement.

The following recitation will describe the noted tensionless means 18 in greater detail. Tensionless apparatus 18 is illustrated in FIGS. 2–11 in both exploded and plan views. In FIG. 7, the actuator means 54 shifts the lock control disc 50 to activate the tensionless device. Actuator means 54 includes a manual actuator, which is preferably in the form of a lever or a push button, which is biased by a spring 62a, to return to its initial position after manual overt actuation by the occupant, to move a cable 70 and thus a cylindrical cam 71 projecting from the end of the cable at a right angle thereto and forming a T-shaped end, which is fitted into a hollow bore 69 in an actuator cam lug 66 fixed to one side of a rotatable actuator pin 73. As best seen in FIG. 2, actuator pin is journaled to rotate about its longitudinal axis with one end of pin 73 journaled in a stationary member 75 fixed to cover 24, and the other end journaled in a bore in the cover 24. The pin 73 is thus rotatable with a push or pull of the cable 70, which turns the pin 73 to cause its internal cam end 68, which is of semicircular cross-section, to turn from the detent position of FIG. 5. In the detent position, tab 98 on the lock control disc 50 is in a space 76 between stationary detent shoulders 77 and 77a on the cover 24 and is movable to the activated position (FIG. 6) with tab 98 shifted to a position in which a pointed end 99 on the tab 98 has been lifted or translated from the space 76 and is positioned on a downward sloping surface of a ramp 72.

Figure 5:
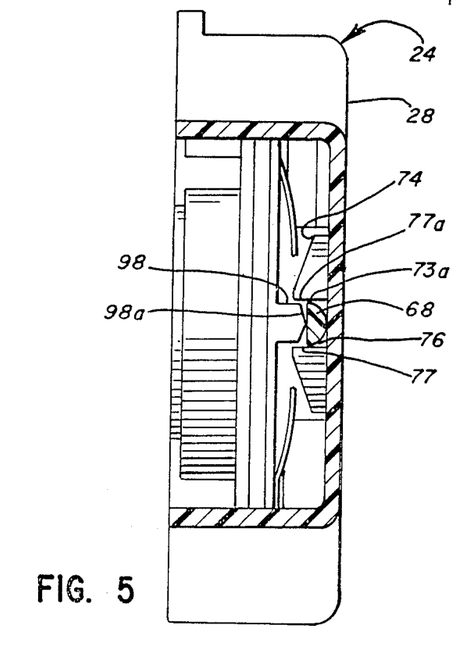
FIG. 5 is a side view of the tab and detent of FIG. 2 along line 5—5 in the reference position.

As best seen in FIG. 5, turning of actuator pin 73 counterclockwise causes its upper edge 73a to move against inclined cam surface 98a on the tab 98 and to push the latter down and to the left, as viewed in FIG. 5, thereby lifting tab 98 from detent gap 76. This movement of tab 98 rotates disc 50 slightly to the position of FIG. 6, where tab point 99 is on the sloped surface of the up ramp 72, which positions lock control disc 50 in its activated state for movement into its tensionless position. The actuator spring 62a shifts the cable to turn the actuator pin 73 back to its centered position of FIG. 5. A subsequent protraction of the belt will rotate control disc 50 to move the tab point 99 further down the up ramp 72 and to position window 100 on control disc 50 under the pawl stud 141. Manifestly, the actuator means 54 could include an electrical switch operated by the occupant to cause a solenoid or other electrical actuator to shift the tab 98 from the detented position of FIG. 5 to the activated position shown in FIG. 6.

Lock control disc or first rotatable member 50 is illustrated in FIGS. 10 and 11 with front surface 90, and a cam control circumference 92 engageable with pawl stud 141, a central bore 94, and a back surface 96. Disc 50 has the tab 98 which extends normally from back surface 96, and a slot or window 100 along circumference 92, which may be an arc-shaped slot to allow the stud 141 to drop and thereby lower the pawl to engage the ratchet wheel. An annular wall 102 extends from front surface 90 for frictional engagement and travel with a contact surface or flange 41 of ratchet 40. This frictional engagement comprises a friction clutch between the ratchet wheel and the lock control disc. Window 100, as further disclosed below, defines the limits of the tensionless mode per se.

Unlocking disc 38, as illustrated in detail in FIGS. 8 and 9, has an annular shape with a circumference cam surface 108 to hold the pawl stud 141 up, and to lift the pawl from the ratchet to allow automatic belt rewind. The unlocking disc 38 also has an outer surface 104, a central through-bore 106, and a groove 122 with shoulder 124, base 126 and ramp 128 sloped from base 126 to outer edge 108. Unlocking disc 38 is mounted in cavity 26 of housing 24 with annulus 34 extending through bore 106. Disc 38 has a sidewall 109 cooperating with inner surface 112 to define a partial cavity 110.

The unlocking disc 38 is shifted, for example, by a door actuator mechanism 64, to rotate the cam surface 128 to cam upwardly the stud 141 which then rides on the cam circumferential surface 108, holding the pawl nose above the ratchet teeth, as shown in FIG. 2. The unlocking disc has a lug 114, which pivots downwardly, as the disc is rotated counterclockwise by the door actuator. The preferred and illustrated door actuator includes a spring-biased door plunger, which is pushed inwardly by the door as it swings closed and which is pulled by a spring as the door opens in a conventional manner. This door plunger is connected by a cable 79 to a T-end 81, which includes a cylindrical pin 83 which is received in a cylindrical bore 116 in the second lug 114 on the unlocking disc. The second lug 114 projects from surface 112 generally normally thereto and has the through-bore 116 extending in the longitudinal direction with an intersecting blind-hole cross-bore 118 to receive the cable and intersecting bore 116. Second lug 114 is coupled to and operable with external disengaging means 64 by coupling means 79 (cf. FIGS. 2, 4 and 7), which means 64 may be the door plunger or which may be an electrical switch operable by an automobile door during its opening and closing to operate a solenoid (not shown) to rotate the unlocking disc. Slot 122 is operable to receive the stud 141 of securing means 58, to allow the pawl to lower to engage the ratchet.

Cover or housing 24, as illustrated in FIG. 7, has annulus or annulus members 34 and post 32 extending from inner surface 36. Cover 24 is generally cup-shaped and includes a plurality of mounting lugs 132 and a projecting mounting post or stud 134. Sidewall 136 cooperates with inner surface 36 to define cavity 26, which is generally operable to receive the assembly comprising tensionless or tension-relieving means 18. The up ramp 72 and the down ramp 74 are formed on the cover inner surface and project toward the ratchet wheel. The detent space 76 is located between shoulders 77 and 77a on the ramps 72 and 74.

Securing means 58 in FIG. 7 is a pawl for engagement with ratchet teeth 42 or engagement in ratchet grooves of ratchet 40. Pawl 58 is shown as having a dogleg shape with a through-bore 130 at one end to receive mounting post 134, and pawl 58 is pivotable or rotatable thereon. Stud 141 extends generally normally from rear face 142 of pawl 58. Pawl 58 includes a bead 143 for maintaining pawl 58 in its pivotable position in retractor assembly 10.

As illustrated in FIG. 3, the assembly has ratchet 40 with hub 39, which is seated within annulus 34. As noted above, ratchet 40 includes a central hub 39 about which are a plurality of teeth 42 engageable with pawl 58, which pawl 58 will restrain rewinding action of reel 14 by retention of the ratchet 40. In the assembly, disc spring 52 is mounted against annulus 34 and about hub 39 to bias the lock control disc 50 against the friction surface 43 of ratchet flange 41. Therefore, lock control disc 50 is normally biased to move and rotate with ratchet 40, which ratchet is mounted on shaft 16 with fingers 45 and rotatable with shaft 16. As the vehicle door closes, remote door actuator 64 moves lug 114 through connecting means 79 to rotate automatically-operable actuator or unlocking disc 38 into the position noted in FIG. 4 with groove 122 in position to receive stud 141 of pawl 58 when window 100 of disc 50 is aligned therewith. Initially, when the occupant buckles himself in with the seat buckle on his shoulder, the tensionless device is inoperative and in its release state, with belt tension on the shoulder of the occupant. In this initial position, the lock control disc is detented with tab means 98 in the detent space 76 between ramps 72 and 74, as shown in FIG. 2. In this configuration, tab 98 is constrained between the ramp shoulders 77 and 77a, and the pawl 58 is raised with stud 141 on the cam surface 92 holding the pawl above the ratchet teeth 42 to maintain belt 12 in a tensioned state.

Figure 6:
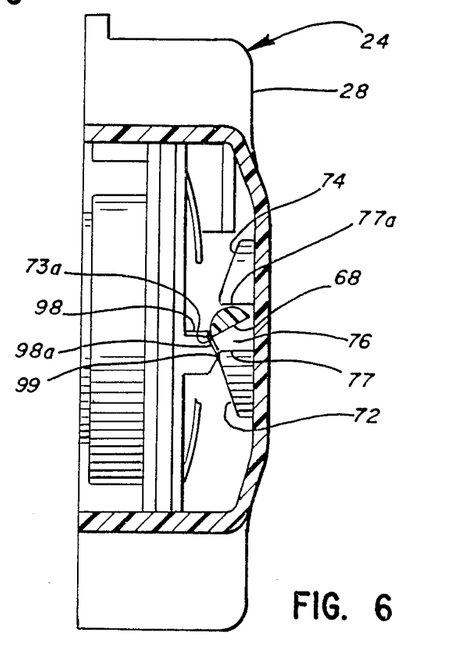
FIG. 6 is a side view of the tab and detent disc of FIG. 5 in the activated position.

The tensionless mode may be initiated by depression or actuation of manual overt actuator 62 to turn pin 73 to move the tab 98 and the lock control disc 50 axially inwardly toward the ratchet wheel 40 and to turn lock control disc clockwise to the activated position shown in FIG. 2A. That is, the activated state or mode is attained by the actuation of manual actuator 62 to rotate lug 66, arm 55 and end 68 to displace tab 98 from detent space 76 with tab point 99 on sloped surface 72, as seen in FIG. 6. Thereafter, protraction of the belt turns the reel and the ratchet, and frictional engagement of lock control disc 50 with ratchet 40 moves window 100 on the lock control disc into alignment with groove 122 beneath the stud 141, the pawl 58 rotates down and positions the stud 141. At alignment of window 100 and groove 122, pawl 58 with stud 141, which is rotatable on mounting means 134, is nested in the aligned groove 122 and window 100. Pawl 58 engages ratchet 40 to inhibit retraction of belt 12, which is biased by spring 22 to rewind reel 14, thus attaining the tensionless state, as illustrated in FIG. 4. Subsequent protraction of belt 12 in the tensionless state will rotate lock control disc 50, which is biased by spring 22 in the rewinding direction, to move pawl stud 141 along lower surface 101 and up ramp 105 to circumference cam surface 92 to lift the pawl 58, and thereby be in the "memory" state. If belt protraction is less than the predetermined "memory" range of the cam surface 92, as the occupant leans back to allow belt rewind, lock control disc 50 will rotate in the rewinding direction to reengage the tensionless mode when window 100 and groove 122 are aligned to receive pawl stud 141 and to allow pawl end 148 to drop into engagement with one of ratchet teeth 42. Protraction beyond the predetermined memory range will rotate the lock control disc through a distance to cause the point 99 on the tab 98 to slide along the down ramp until the point slides off at shoulder 77a and moves toward the cover to again nest in detent space 76 and thereby resetting the tensionless device in its original tensioned and detented state.

As shown in FIG. 4, the tensionless state is defined by aligning the stud 141 with the groove 122 and window 100 to allow engagement of pawl end 148 with ratchet teeth 42. When in tensionless mode, a belt 12 protraction which rotates the tab 98 less than the distance to reenter detent 76 with the cam surface 92 holding the stud 141 and pawl upwardly, allows the spring bias to act to rewind belt 12 and reposition window 100 in alignment with groove 122 to permit stud 141 to again nest therein for pawl 58 engagement with ratchet 40, thus reestablishing the tensionless mode.

In FIGS. 2, 4 and 7, first rotatable member 50 has a generally circular shape with the arc-shaped window 100 at its circumference 92. When the disc 50 is rotated in the clockwise direction from the tensionless position, inclined cam surface 105 cams stud 141 upwardly to the circumference cam surface 92. With the vehicle door closed, groove 122 on the unlocking disc is aligned for receipt of pawl stud 141 and when the unlocking disc 38 is rotated by the automatic operator 64, the inclined cam surface 128 of unlocking member 38 lifts stud 141 onto cam surface 108, and thereby the pawl from the ratchet, to cause automatic belt rewind. As noted above, the tensionless mode per se is defined where window 100 is in alignment with groove 122 of automatically operable a actuator or unlocking disc 38, which alignment can receive pawl stud 141 for pawl end 148 engagement with ratchet teeth 42 for securing reel 14 from rewinding belt 12.

Belt 12 includes a "memory" in the tensionless mode. That is, with pawl stud 141 nested in window 100 and groove 122, the belt 12 may be protracted a short distance, such as less than three to four inches, and thereafter returned to the tensionless setting. The memory position is achieved by protraction of belt 12, as seen in FIGS. 2, 4 and 7, in a clockwise rotation of ratchet 40 and first rotational member 50. This rotary motion of first rotational member 50 moves pawl stud 141 along lower surface 101 and inclined surface 105 of window 100, to ride along the circumference cam surface 92. This upward travel of the stud 141 lifts and disengages pawl 58 from ratchet teeth 42 and enables bias means 22 to again apply a biasing or tensioning force to reel 14 and belt 12. Restoration of the tensionless mode is accomplished when the occupant leans back and the cam surface 92 travels along under the pawl stud 141 until the lower surface 101 comes under the stud, which then is lowered into window 100. That is, for belt protraction less than the predetermined distance, pawl stud 141 continues to ride cam circumference 92 on disc 50, as biased by spring 22, as the latter turns counterclockwise to return to the tensionless setting in which the window 100 aligns with groove 122 and stud 141 drops therein. Thus, travel of pawl stud 141 on cam circumference 92 without repositioning tab 98 in the detent 76 will operate as the "memory" or memory distance. As noted above, travel beyond the predetermined distance will reposition tab 98 in the detent 76 with the cam surface 92 positioned to lift the stud 141 and thereby hold pawl 58 disengaged from ratchet 40.

At occupant egress from the vehicle with belt 12 and tension-relieving means 18 in the tensionless position, an opening of the door actuates door actuator 64 to move connecting means 79, which is coupled to lug 114, to rotate the automatically-operable unlocking disc 38 about annulus 34. Rotation of disc 38 in a clockwise direction from the position shown in FIG. 4 will move upwardly-sloped ramp 128 to engage and to lift pawl stud 141 with the pawl 58 pivoting about pivot stud 134. Pawl 58 is lifted and disengaged from ratchet 40, which allows bias means 22 to urge reel 14 to rewind belt 12, and the belt 12 will again be at its tensioned state. If the belt is stretched as shown in FIG. 12 when the door is open, the tension is on the belt to rewind the belt onto the reel as the door is closed. During this rewind, lock control disc 50, which is biased for frictional engagement with ratchet 40, will rotate with ratchet 40 during the belt rewinding to travel up the ramp 72 and then drop into the detent space 76, whereby the shoulder 77a holds the tab 98 against further counterclockwise rotation. With the control disc 50 detented, the cam surface 92 is holding pawl nose 148 from the ratchet wheel and the window 100 on the control disc will not be beneath the pawl stud 141. Closure of the vehicle door will rotate the unlocking disc 38 to position its groove 122 beneath the pawl stud 141, but the cam surface 92 on the disc 50 still holds the pawl from the ratchet wheel. In order to reestablish the tensionless state, the occupant must make the conscious act of actuating the manual overt actuator 62 and thereafter protract the belt, which protraction rotates the disc 50 to bring the window 100 beneath the pawl stud 141, allowing the pawl to drop to engage the ratchet and thereby establish the tensionless mode.

From the foregoing, it will be seen that the tensionless device may be belt-manipulated into a tensionless state only after an overt, deliberate manual actuation followed by a belt protraction by the occupant. Thereafter, belt manipulations will either have caused a memory position, or a movement to a release position or state to cause belt rewind.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. In a seat belt retractor for rewinding a seat belt said retractor comprising:
    a reel;
    a first biasing means for biasing the reel to retract and to rewind the belt on the reel;
    an emergency locking means for locking the belt against protraction at the time of an accident;
    a tension-relieving means for relieving a tension force positionable in a tension-relieving position applied by the belt onto an occupant body in a vehicle by blocking belt retraction and rewinding movement of the reel and positionable in a release position in which the tension-relieving means is inoperable from relieving belt tension;
    a manual overt actuator for shifting the tension-relieving means to an activated position from which said tension-relieving means may be shifted to the tensionless position by belt protraction; and,
    means operable by belt protraction beyond a predetermined distance to shift the tension-relieving means from its tension-relieving position to its release position allowing the biasing means to rewind the belt onto the reel, a detent means to detent the tension-relieving means in the release position allowing belt rewind by the biasing means, the tension-relieving means comprising a first rotatable member operable to shift from a detented position in which the first rotatable member is detented by the detent means to the activated position, said first rotatable member movable from said activated position by a subsequent belt protraction to said tension-relieving position.

2. In a seat belt retractor as claimed in claim 1, said tension-relieving means having a pawl and ratchet means, which ratchet means is connected to said reel and rotatable therewith until engaged by said pawl, said first rotatable member allowing the pawl to engage the ratchet means when the first rotatable member is in the activated position.

3. In a seat belt retractor as claimed in claim 1, said first rotatable member comprises a discharge having a tab means and rotatable by frictional engagement with said ratchet means, said detent means detenting the first rotatable member at the release position.

4. In a seat belt retractor as claimed in claim 1 wherein said first rotatable member has a tab means and further comprising:
    a housing defining an enclosure;
    said detent means mounted on said housing and having detenting engagement with the tab means to hold said first rotatable member at said release position until said tab means and first rotatable member are shifted by said manual overt actuator to said activated position.

5. A seat belt retractor as claimed in claim 4 wherein said housing has an inner surface; said detent means having a first ramp with a first sloped surface and a second ramp with a second sloped surface, said first and second ramps mounted on said housing inner surface and cooperating to define a detent therebetween;
    cam means operable by said manual overt actuator arm to shift the tab means from the detent;
    said tab means positioned in said detent at said release position, which tab means is movable from said detent to said activated position by actuation of said manual overt actuator and said cam means.

6. In a seat belt retractor as claimed in claim 5, said retractor further comprising a shaft biased by said first biasing means;
    said reel mounted on said shaft; said tension relieving means including:
    a ratchet means being fixedly connected to said shaft;
    said first rotatable member being frictionally engaging and rotatable with said ratchet means, said rotatable member having a cam surface and a window in said cam surface; and
    a pawl operable to engage said ratchet means to restrain rewinding of said belt, said pawl having a pawl stud which nests in said window to allow the pawl to engage said ratchet means to establish the tensionless mode.

7. An automotive seat belt retractor assembly for rewinding a seat belt for securing a vehicle occupant, which vehicle has at least one door,
    said assembly having a reel for rewinding said belt thereon,
    a first biasing means for biasing the reel to retract and rewind the belt on the reel,
    an emergency locking means for locking the belt against protraction at the time of an accident,
    a tension-relieving means having a tensionless position for relieving a tension force applied by the belt, which tension-relieving means comprises:
    a manual overt actuator operable by a seat occupant to shift into an activated state to allow belt rewind;
    a ratchet means coupled to and operable with said reel;

a pawl means for engaging and securing said ratchet means against belt rewinding on said reel;

a rotatable lock control member operable by said manual overt actuator to shift the lock control member from a detent position in which the belt is tensioned and the pawl means is disengaged from the ratchet means to an activated position;

said rotatable lock control member movable with subsequent belt protraction from its activated position to its tensionless position allowing the pawl means to engage the ratchet means to position the tension-relieving means in the tensionless position;

a memory cam on the lock control member for holding pawl means from the ratchet means for a limited predetermined belt protraction and for return to the tensionless position; and, detent means for detenting the lock control member in its detented position with belt protraction beyond the predetermined belt protraction, said lock control member having means thereon to disengage the pawl means from the ratchet means to allow belt tension on the occupant.

8. The combination of claim 7 in which said lock control member is a rotatable disc mounted to turn about an axis through the ratchet means.

9. An automotive seat belt retractor assembly as claimed in claim 8 a frictional surface on said ratchet means engages a frictional surface on the lock control member to rotate the latter with belt protraction, or retraction.

10. An automotive seat belt retractor in accordance with claim 9 which said detent means comprises a pair of cam surfaces having shoulders therebetween and a tab on the lock control disc to fit between the shoulders.

* * * * *

UNITED STATES PATENT AND TRADEMARK OFFICE
CERTIFICATE OF CORRECTION

PATENT NO. : 4,976,474
DATED : December 11, 1990
INVENTOR(S) : Doty, et al.

It is certified that error appears in the above-identified patent and that said Letters Patent is hereby corrected as shown below:

ON TITLE PAGE: Item [73] Assignee, change "Occupany" to --Occupant--.

Column 1, Line 37, change "assume" to --assure--.

Column 10, Line 11, change "discharge" to --disc--.

Column 12, Line 9, after "claim 8" insert --wherein--.

Column 12, Line 11, after "protraction" delete comma.

Column 12, Line 15, after "claim 9" insert --in--.

Signed and Sealed this

Twenty-third Day of June, 1992

Attest:

DOUGLAS B. COMER

*Attesting Officer*   *Acting Commissioner of Patents and Trademarks*